US012699746B2

(12) United States Patent
Casalino et al.

(10) Patent No.: US 12,699,746 B2
(45) Date of Patent: Aug. 4, 2026

(54) CUSTOM PUBLISHER SYSTEM INTEGRATION

(71) Applicant: Yext, Inc., New York, NY (US)

(72) Inventors: Calvin Casalino, New York, NY (US);
Edward Riker, Brooklyn, NY (US)

(73) Assignee: Yext, Inc., New York, NY (US)

( * ) Notice: Subject to any disclaimer, the term of this patent is extended or adjusted under 35 U.S.C. 154(b) by 140 days.

(21) Appl. No.: 17/549,285

(22) Filed: Dec. 13, 2021

(65) Prior Publication Data

US 2023/0185584 A1 Jun. 15, 2023

(51) Int. Cl.
*G06F 16/958* (2019.01)
*G06F 16/21* (2019.01)
*G06F 16/901* (2019.01)

(52) U.S. Cl.
CPC .......... *G06F 16/958* (2019.01); *G06F 16/212* (2019.01); *G06F 16/9024* (2019.01)

(58) Field of Classification Search
CPC ... G06F 16/958; G06F 16/212; G06F 16/9024
USPC ........................................................ 707/736
See application file for complete search history.

(56) References Cited

U.S. PATENT DOCUMENTS

| | | | | |
|---|---|---|---|---|
| 10,200,248 | B1 * | 2/2019 | Jiang ................... | H04L 41/0879 |
| 10,990,988 | B1 * | 4/2021 | Goyette ............. | G06Q 30/0202 |
| 11,947,946 | B1 * | 4/2024 | Rao ........................ | G06N 20/20 |
| 2007/0073845 | A1 | 3/2007 | Reisman | |

| | | | | |
|---|---|---|---|---|
| 2007/0220106 | A1 | 9/2007 | Reisman | |
| 2012/0131184 | A1 | 5/2012 | Luna | |
| 2015/0040103 | A1 | 2/2015 | Nyisztor | |
| 2016/0232480 | A1 * | 8/2016 | Erez ........................ | G06Q 20/12 |
| 2016/0261727 | A1 * | 9/2016 | Yang ................... | G06F 11/2035 |
| 2018/0121519 | A1 * | 5/2018 | Cook .................. | G06F 16/2457 |
| 2018/0137317 | A1 * | 5/2018 | Lee ..................... | G06K 7/10722 |
| 2018/0218391 | A1 * | 8/2018 | Slain .................. | G06Q 30/0246 |
| 2018/0247268 | A1 * | 8/2018 | Vanasco ................. | G06Q 50/01 |
| 2019/0130468 | A1 * | 5/2019 | Lerman .............. | G06Q 30/0281 |
| 2020/0104304 | A1 * | 4/2020 | Oliner ............... | G06F 16/24564 |
| 2020/0125590 | A1 * | 4/2020 | Ferrentino ........... | G06F 16/245 |
| 2020/0396291 | A1 * | 12/2020 | Heydlauf .............. | G16H 10/60 |
| 2021/0157858 | A1 * | 5/2021 | Stevens ................. | G06F 40/237 |
| 2021/0250335 | A1 * | 8/2021 | Lyndon-James .... | H04L 63/0236 |
| 2021/0294792 | A1 * | 9/2021 | Sanshwe ............. | G06Q 10/101 |
| 2021/0304021 | A1 * | 9/2021 | Puri ........................ | G06N 5/02 |
| 2021/0366586 | A1 * | 11/2021 | Ryan .................. | G06Q 20/3224 |

(Continued)

OTHER PUBLICATIONS

PCT Notification of Transmittal Of The International Search Report And The Written Opinion Of The International Searching Authority for PCT Application No. PCT/US2022/50274, mailed Feb. 14, 2023, 12 pages.

*Primary Examiner* — Amy Ng
*Assistant Examiner* — Antonio J Caiado
(74) *Attorney, Agent, or Firm* — Jeffri A. Kaminski; Venable LLP

(57) ABSTRACT

A system and method to identify a first data stream from a data graph associated with a merchant system. A configuration file associated with a publisher system to receive data associated with the merchant system is identified. Based on a configuration file associated with the publisher system, a second data stream is generated which includes the data associated with the merchant system. The second data stream is transmitted to the publisher system.

20 Claims, 6 Drawing Sheets

(56)                    References Cited

U.S. PATENT DOCUMENTS

| | | | | |
|---|---|---|---|---|
| 2021/0368028 A1* | 11/2021 | Rowlands | ............. | G06F 16/258 |
| 2021/0374143 A1* | 12/2021 | Neill | ...................... | G06F 16/254 |
| 2022/0103427 A1* | 3/2022 | Mallipudi | ................. | G06F 8/65 |
| 2022/0350966 A1* | 11/2022 | Thomas | .............. | G06F 9/44505 |
| 2022/0365774 A1* | 11/2022 | Biesdorf | ................... | G06F 8/36 |
| 2022/0394030 A1* | 12/2022 | Biermann | ................ | G06F 8/61 |
| 2023/0128753 A1* | 4/2023 | Bawa | ........................ | G06F 8/20 |
| | | | | 717/176 |

* cited by examiner

Figure 5:
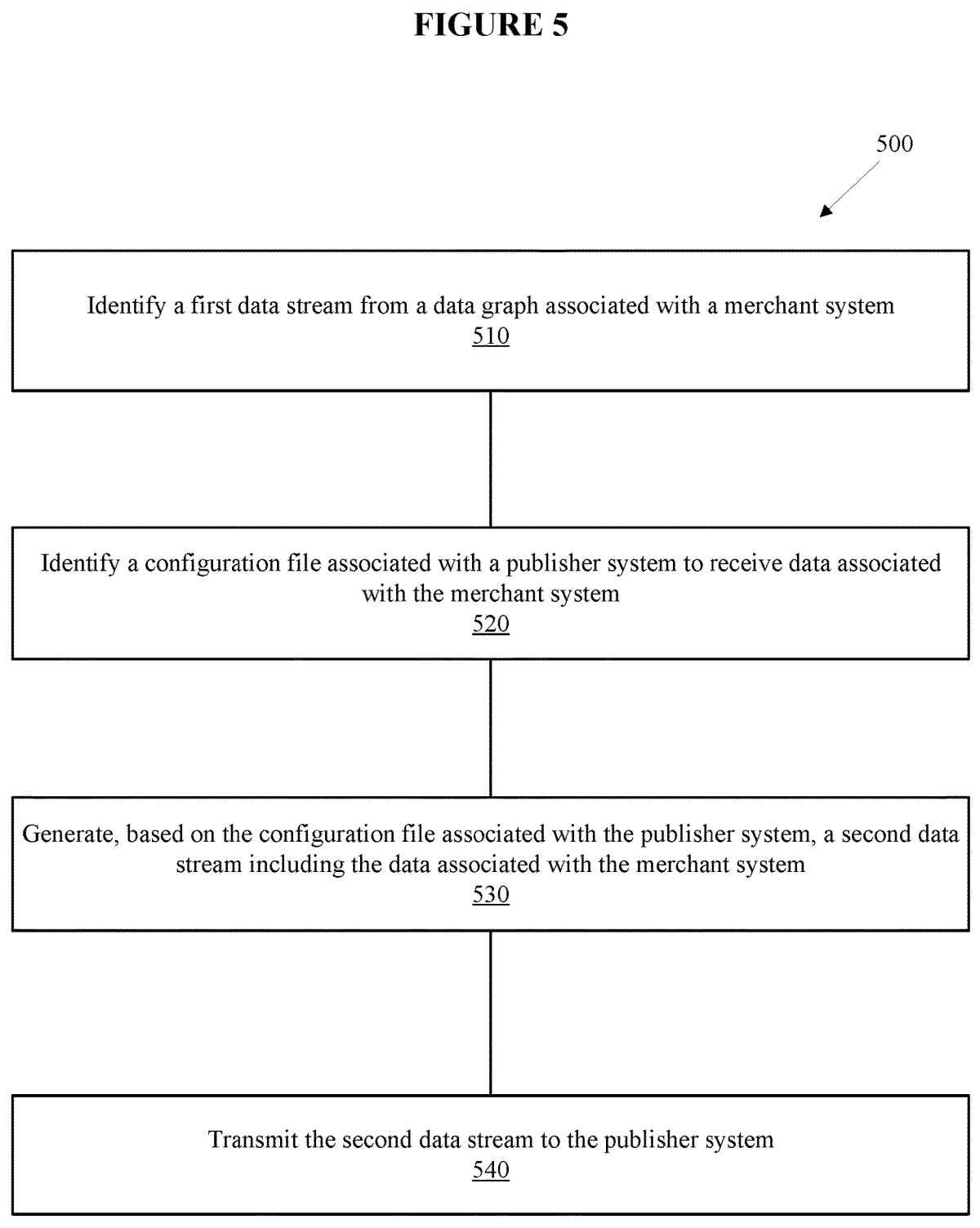

Identify a first data stream from a data graph associated with a merchant system
510

Identify a configuration file associated with a publisher system to receive data associated with the merchant system
520

Generate, based on the configuration file associated with the publisher system, a second data stream including the data associated with the merchant system
530

Transmit the second data stream to the publisher system
540

CUSTOM PUBLISHER SYSTEM INTEGRATION

TECHNICAL FIELD

Embodiments of the disclosure are generally related to data processing and publishing, and more specifically, are related to enabling integration of a custom publisher system to publish data associated with a merchant system.

BACKGROUND

Consumers and merchants rely heavily on the distribution of information via web-based services. One such service is searchable listings provided by a search service (hereinafter, a "search provider system," "provider system," "provider site," or simply, a "provider"). Examples of providers include "yellow pages" or "Internet yellow pages," e.g., Google.com, Amazon.com, Yahoo.com, Yelp.com, MapQuest.com, Superpages.com, etc. Searchable listings may be provided for an entity (e.g., an advertiser, a business, an organization, a government agency, users of a provider system, etc.). Listings may include information relating to a merchant system or business, such as restaurants, people information, product information, etc. The information provided may include, for example, a name of a person or business, addresses, telephone numbers, web site URLs, photos, videos, e-mail addresses, etc. A consumer may be presented with other information about a merchant system by either clicking anywhere in the listing, or placing a mouse pointer or finger over a portion of the listing.

In order to provide updated, accurate, and timely information to a maximum number of end-user systems (e.g., customer systems), a merchant system may engage a number of publisher systems that provide portals to end-user systems for information about the merchant system. An intermediate system may be employed to manage and deliver information associated with a merchant system to the one or more publisher systems. However, a typical intermediate system is configured to create integrations for delivery of data to a publisher system via hard-coded integrations. In such arrangements, each new integration with a publisher system requires new customized code and a fully hosted integration, creating a technological barrier for a new or custom publisher system to be integrated on behalf of a merchant system.

BRIEF DESCRIPTION OF THE DRAWINGS

The present disclosure is illustrated by way of example, and not by way of limitation, and can be more fully understood with reference to the following detailed description when considered in connection with the figures as described below.

FIG. 5 illustrates an example method of generating and transmitting a data stream including data associated with a merchant system to a publisher system, in accordance with a configuration file associated with the publisher system, in accordance with one or more aspects of the disclosure.

DETAILED DESCRIPTION

Figure 1:
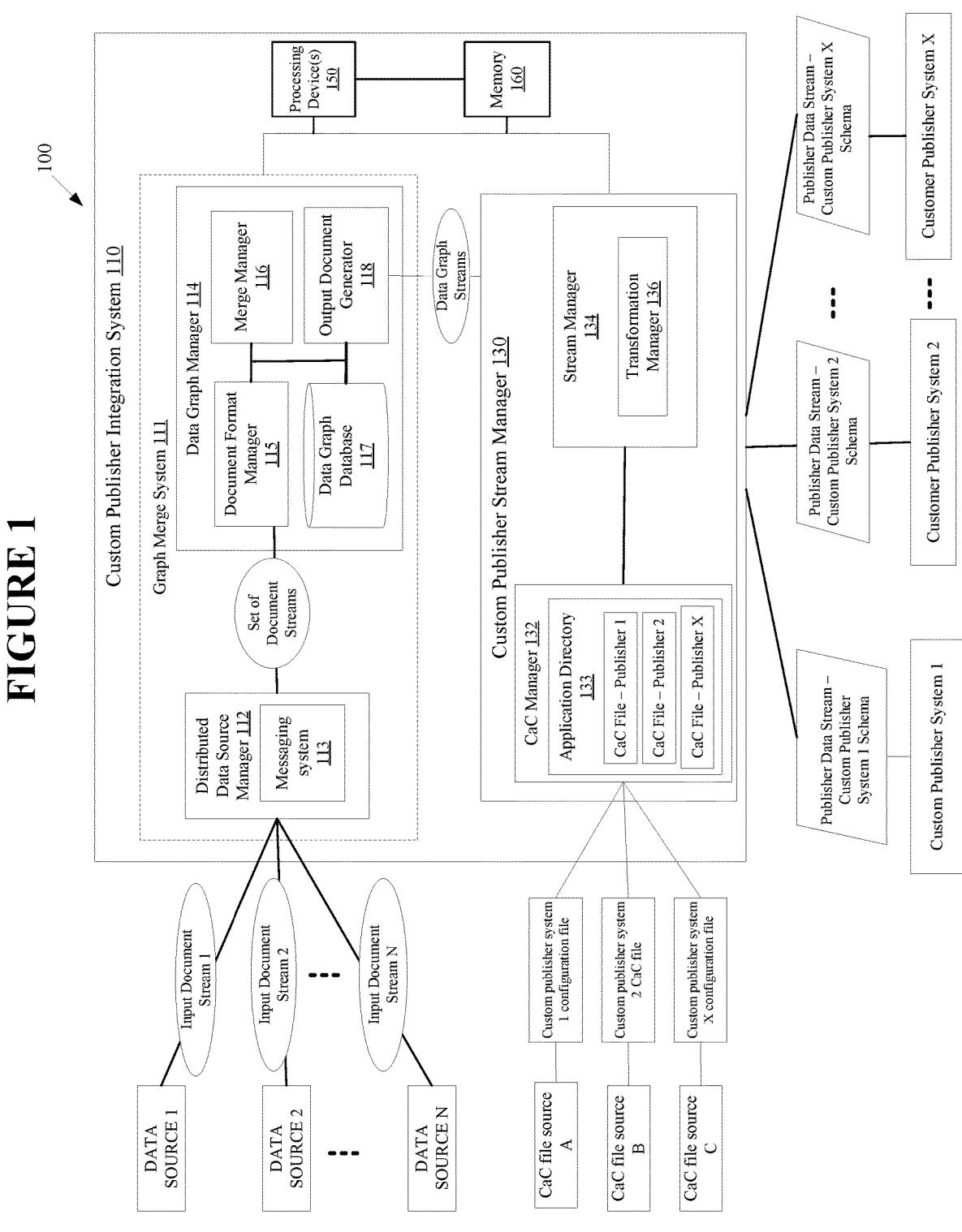
FIG. 1 illustrates an example of a computing environment including a custom publisher integration system to integrate a custom publisher system to receive a data stream including data associated with a merchant system, in accordance with one or more aspects of the disclosure.

The present application relates to methods and systems to the integration of a custom publisher system for the distribution of information relating to a merchant system. According to embodiments, a custom publisher integration system is provided to enable a user (e.g., a user of merchant system; also referred to as a "merchant user") to create a complete custom publisher integration in a low code environment. The custom publisher integration system can be executed based on a configuration as code (CaC) file (e.g., a JavaScript Object Notation (JSON) file). In an embodiment, a CaC file associated with a custom publisher system (herein referred to as a "publisher CaC file" or "publisher configuration file") is established which includes a set of custom configuration properties that define the custom integration. The custom configuration properties can include one or more properties including general properties (e.g., identifiers, file schema, name, stream properties, data transformation properties, data mapping properties, integration definitions, required fields identified by a publisher, required schema of fields identified by the publisher, a publisher display name, a publisher medallion, a publisher description, etc. Example integration definitions can include application data interface (API) endpoints to send data to, API credentials (e.g., Oauth, tokens, etc.), accepted update cadence or frequency, an SSH file transfer protocol (SFTP) address, username, and password, a file named to be created, a file format (e.g., a common-separated value (CSV) file format), a file delivery schedule, publisher specific metadata (e.g., an account identifier), etc.

According to embodiments, the custom publisher integration system enables the installation of a publisher CaC file via an application directory. In an embodiment, the CaC file defines a document schema that, when specified in a data stream, ensures the fields in the stream output match the expected fields in the schema file. The publisher CaC file is used by the custom publisher integration system to transform one or more data streams including data associated with a merchant system to generate published merchant data that is configured for use by the corresponding custom publisher system. The data streams associated with the merchant system are generated by a streaming system based on a data graph including data relating to the merchant system. The streaming system (also referred to as a "graph merge system") uses merchant data stored in a data graph (also referred to as a "knowledge graph") and generates data streams including the merchant system data in a first format or schema. Advantageously, the custom publisher integration system transforms the one or more data graph streams from the first format to a second format associated with a respective customer publisher system based on the corresponding publisher configuration file. In an embodiment, the custom publisher integration system transforms the data graph streams generated by the streaming system in accordance with the configuration properties of the associated publisher configuration file. Advantageously, a third party (e.g., the merchant system or one or more custom publishers) can provide the publisher configuration file to control the transformation of existing data streams including merchant data for serving and provisioning via a corresponding custom publisher system. In this regard, the publisher configuration file can be used to modify merchant data streams to establish configuration and formatting parameters adapted for a particular custom publisher system. This enables merchant-related data stored in a corresponding data graph to be quickly and efficiently streamed from the data graph to one or more downstream systems including one or more custom publisher systems.

Further advantages are achieved by the custom publisher integration system where any user (e.g., a developer, merchant system, publisher system, etc.) can define a custom publisher integration by specifying the publisher configuration file (CaC file). This advantageously enables an external developer to create one or more custom publisher systems that are available for use as applications in an application directory in a quick and efficient manner, without a long business development cycle.

FIG. 1 illustrates an example computing environment 100 including a custom publisher integration system 110 communicatively connected to one or more data sources (e.g., data source 1, data source 2 . . . data source N) to manage data associated with one or more merchant systems for provisioning to one or more custom publisher systems (e.g., custom publisher system 1, custom publisher system 2 . . . custom publisher system X). The custom publisher integration system 110 manages respective publisher configuration files (e.g., CaC files) corresponding to each custom publisher system that is added as a downstream recipient and publisher of merchant data. The custom publisher integration system 110 generates publisher data streams for each integrated custom publisher system in accordance with a respective publisher configuration file, as described in greater detail below with reference to FIGS. 1-6.

As shown in FIG. 1, the customer publisher files (e.g., custom publisher system 1 configuration file corresponding to customer publisher system 1, custom publisher system 2 configuration file corresponding to customer publisher system 2 . . . custom publisher system X configuration file corresponding to custom publisher system X) are stored and managed by the custom publisher integration system 110 to enable the generation of publisher data streams to be provisioned to the respective custom publisher systems.

In an embodiment, the custom publishers systems may be any suitable computing device (e.g., a server, a desktop computer, a laptop computer, a mobile device, etc.) associated with a user (e.g., a company) associated with a website including one or more web pages generated by the custom publisher integration system 110. The custom publisher integration system 110 may be communicatively connected to the custom publisher systems via a suitable network, application or communication method including a plugin server, an application programming interface (API) server, or a file transfer protocol (e.g., SSH file transfer protocol) associated with the custom publisher system. In an embodiment, the custom publisher integration system 110 may be accessible and executable on one or more separate computing devices (e.g., servers).

According to embodiments, the custom publisher integration system 110 can include one or more software and/or hardware modules to perform the operations, functions, and features described herein in detail. In an embodiment, the custom publisher integration system 110 includes a graph merge system 111 (also referred to as a stream system) configured to generate data graph streams including data from a data graph associated with a respective merchant system.

In an embodiment, the generated data graph streams (e.g., a data graph stream associated a respective merchant system of multiple different merchant systems that have data that is managed by the graph merge system 111) is provided to a custom publisher stream manager 130. In an embodiment, the custom publisher stream manager 130 can include one or more software and/or hardware modules to perform the operations, functions, and features described herein in detail. In an embodiment, the custom publisher stream manager 130 includes a CaC manager 132 including an application directory 133 and a stream manager 134 including a transformation manager 136 configured to generate publisher data streams for provisioning to a respective custom publisher system based on a corresponding CaC file associated with the custom publisher system.

The graph merge system 111 and custom publisher stream manager 130 are operatively coupled to one or more processing devices 150 and one or more memory devices 160 (e.g., memory devices to store instructions executable by the one or more processing devices 150 to perform the operations and functions described herein). In one embodiment, the components or modules of the custom publisher integration system 110 may be executed on one or more computer platforms of a system associated with an entity that are interconnected by one or more networks, which may include a wide area network, wireless local area network, a local area network, the Internet, etc. The components or modules of the custom publisher integration system 110 may be, for example, a hardware component, circuitry, dedicated logic, programmable logic, microcode, etc., that may be implemented in the processing device of the knowledge search system.

In an embodiment, the graph merge system 111 manages user knowledge graphs (e.g., data graphs associated with one or more merchant systems) based on the input data streams from the disparate data sources and generates output document streams (also referred to as "streams" or "input streams"). In an embodiment, the graph merge system 111 generates one or more data graph streams including merchant system-related data from a corresponding data graph. The graph merge system 111 provides the data graph streams to the custom publisher stream manager 130. The custom publisher stream manager uses a corresponding CaC file to transform the data graph streams into a publisher data stream corresponding to a downstream custom publisher system, as described in greater detail below.

In an embodiment, the graph merge system 111 includes a distributed data source manager 112 including a messaging system 113, a data graph manager 114 including a document format manager 115, a merge manager 116, a data graph database 117, and an output document generator 118. In an embodiment, the generated data graph streams are supplied to the custom publisher stream manager by the output document generator 118 for use in generating the publisher data stream in accordance with a CaC file associated with a custom publisher system. According to embodiments, the graph merge system 111 manages and maintains a data graph corresponding to the data associated with the one or more merchant systems (also referred to as the respective knowledge graphs corresponding to the merchant systems that are stored or maintained in the data graph database 117), as described in greater detail below.

According to embodiments, the CaC manager 132 maintains an application directory 133 in which CaC files corresponding to respective custom publishers (e.g., custom publisher 1, custom publisher 2 . . . custom publisher X) are installed, stored and maintained. The CaC files can include information associated with one or more configuration properties that are used to define a format or schema corresponding to a publisher data stream. In an embodiment, the configuration properties can include one or more properties including general properties (e.g., a name of the publisher system, a medallion (e.g., a URL associated with entity listings corresponding to the publisher system, a description of the publisher system, etc.), stream properties (e.g., data entity types, input data, etc.), data transformation properties (e.g., information or functions used to transform a format, schema, or other characteristic of input data, a data field, a data entity, etc.), data mapping properties (e.g., target destination fields, data mappings, etc.), and other information that can be used to enable the integration of a custom provider system.

According to embodiments, installing a CaC file in the application directory enables the stream manager 134 to define a stream to pull the necessary data from the data graph streams of the graph merge system 111 and execute subsequent API calls or file posts to fulfill a custom publisher integration. The stream definition is dependent on the installation of the publisher CaC file. In an embodiment, the data graph streams are defined and generated based on the publisher CaC file. In an embodiment, the stream manager 134 builds a user-defined configuration that defines the data being posted to an external custom publisher system, rather than pulled from that external system. In an embodiment, the user-defined configuration is used for the output of data from the data graph.

Advantageously, the custom publisher stream manager 130 can synchronize data from the one or more data graphs (i.e., knowledge graphs) to the one or more custom publisher systems in accordance with a supplied configuration (e.g., a configuration defined by a corresponding CaC file installed in the application directory 133). In an embodiment, the custom publisher stream manager 130 provides for the creation and maintenance of CaC files for use in establishing data streams used to send data to one or more custom publishers. According to embodiments, the custom publisher system configuration files can be provided by one or more CaC file sources (e.g., CaC file source A, CaC file source B, CaC file source C, etc.). According to embodiments, the CaC file sources can be one or more of a third party developer, a merchant system, a provider system, a developer associated with the custom publisher integration system 110, etc.

According to embodiments, an example CaC file can include one or more properties or elements that are used to fulfill a custom publisher system integration. For example, the CaC file can include a stream element that provides an indication that a corresponding stream is to be created in an account. Each stream can exist on a per publisher system and a per merchant account basis, such that installing two publisher application into the application directory in a single account results in two corresponding streams. In an embodiment, if the CaC file is updated, the corresponding custom publisher stream is also updated. In an embodiment, if the custom publisher is uninstalled, the corresponding custom publisher stream can also be deleted.

In an embodiment, the CaC file corresponding to a custom publisher system is used by the custom publisher stream manager 130 to configure the one or more data graph streams received from the graph merge system 111 into a schema that is suitable for ingestion by a corresponding custom publisher system, as described in greater detail below. In an embodiment, the graph merge system 111 can transmit a file including a dataset associated with a published output document stream to a user system on a periodic basis. In an embodiment, the graph merge system 111 can send a notification to a user system, where the notification is associated with an update to the published output document stream. According to embodiments, the graph merge system 111 may be communicatively coupled to a user system via any suitable interface or protocol, such as, for example, application programming interfaces (APIs), a web browser, JavaScript, etc. In an embodiment, the graph merge system 111 is coupled to the memory 160 which store instructions executable by the one or more processing devices 150 to perform the instructions to execute the operations, features, and functionality described in detail with respect to the graph merge system 111.)

As shown in FIG. 1, the graph merge system 111 is communicatively connected to one or more data sources (e.g., data source 1, data source 2 . . . data source N) and one or more user systems (e.g., user system 1, user system 2 . . . user system X). The graph merge system 111 provides a distributed data graph (also referred to as a "data graph" "knowledge graph" or "user data graph") publishing platform. The graph merge system 111 receives input document streams (e.g., input document stream 1, input document stream 2 . . . input document stream N) from the one or more data sources. The graph merge system 111 merges the data of the multiple input document streams into a corresponding user data graph for the respective user systems (e.g., user system 1, user system 2 . . . user system N) that is persisted in a database (e.g., data graph database 117) of the graph merge system 111. For example, the user systems may be any suitable computing device (e.g., a server, a desktop computer, a laptop computer, a mobile device, etc.) associated with a user system (e.g., a company) associated with a data graph managed and maintained by the graph merge system 111.

According to embodiments, the graph merge system 111 manages the user knowledge graphs based on the input data streams from the disparate data sources and generates output document streams (e.g., data graph streams) for use by the custom publisher stream manager 130 in generating a stream for publication to a corresponding custom publisher system. According to embodiments, the custom publisher system can use the published stream to provide information about the merchant system to one or more end-user systems (not shown in FIG. 1). As used herein, the term "end-user" refers to one or more users operating an electronic device (e.g., end-user system 1) to submit a request for data (e.g., listings data associated with the merchant system, webpage request, a search query, etc.) to the custom publisher system (e.g., custom publisher system 1, custom publisher system 2 . . . custom publisher system X).

In an embodiment, the graph merge system 111 generates one or more data graph streams in accordance with schemas established by a respective user system (e.g., a merchant system). The data graph streams can include multiple documents (e.g., having multiple document types) that are formatted in accordance with the merchant-system schema to enable the output of data to the custom publisher stream manager 130. In an embodiment, document types can include, but are not limited to, an entity type (e.g., a document including data associated with an entity (e.g., a person, a store location, etc.) associated with the merchant system, a listings type (e.g., a document including data associated with a merchant listing), and a review type (e.g., a document including data relating to a review associated with a user system).

The graph merge system 111 may be communicatively connected to the user systems via a suitable network. In an embodiment, the graph merge system 111 may be accessible and executable on one or more separate computing devices (e.g., servers). In an embodiment, the graph merge system 111 can transmit a file including a dataset associated a published output document stream to a user system on a periodic basis. In an embodiment, the graph merge system 111 can send a notification to a merchant system, where the notification is associated with an update to the one or more data graph document streams. According to embodiments, the graph merge system 111 may be communicatively coupled to a user system via any suitable interface or protocol, such as, for example, application programming interfaces (APIs), a web browser, JavaScript, etc.

According to embodiments, the graph merge system 111 can include one or more software and/or hardware modules to perform the operations, functions, and features described herein in detail, including a distributed data source manager 112 including a messaging system 113, a data graph manager 114 including a document format manager 115, a merge manager 116, a data graph database 117, and a output document generator 118, the one or more processing devices 150, and the one or more memory devices 160. In one embodiment, the components or modules of the graph merge system 111 may be executed on one or more computer platforms of a system associated with an entity that are interconnected by one or more networks, which may include a wide area network, wireless local area network, a local area network, the Internet, etc. The components or modules of the graph merge system 111 may be, for example, a hardware component, circuitry, dedicated logic, programmable logic, microcode, etc., that may be implemented in the processing device of the custom publisher integration system 110.

In an embodiment, the distributed data source manager 112 includes a messaging system 113 configured to receive input document streams from multiple data sources (e.g., data source 1, data source 2 . . . data source N). The input document streams include one or more document messages including one or more documents (e.g., a file or other data object that can be electronically transmitted and stored) including data relating to a user system having a data graph managed by the data graph manager 114 of the graph merge system 111. In an embodiment, the messaging system 113 may include a messaging layer configured to read one or more document messages of the input document streams received from the multiple data sources (e.g., data sources such as a software as a service (SAAS) platform, Google™, Yelp™, Facebook™ Bing™, Apple™, Salesforce™, Shopify™, Magento™, a user system (e.g., a source of data relating to a user system that is managed and maintained by the user system), or and other search service providers). In an embodiment, one or more messaging channels are established with the respective data sources to enable transmission of the document messages of the input document streams that are received and processed by the distributed data source manager 112 of the graph merge system 111.

In an embodiment, the messaging system 113 can be configured to receive input document streams from one or more suitable messaging platforms. For example, the messaging system 113 can be configured to interact with a publish-subscribe based messaging system configured to exchange data between processes, application, and servers (e.g., the Apache Kafka® distributed streaming platform). In an embodiment, the messaging system 113 is configured to interact with a publish and subscribe based messaging system to receive the document input streams. In an embodiment, the messaging system 113 is configured to receive document input streams from one or more clusters of servers of the messaging system. In an embodiment, a cluster of the messaging system is configured to store streams of document messages organized or grouped according to a parameter (e.g., a topic), where each document message is associated with identifying information (e.g., a key, a value, and a timestamp). In an embodiment, a topic is used to identify a persistent queue of documents. In an embodiment, a topic identifies documents that are produced by the graph database and are to be processed by the custom publisher integration system 110. In an embodiment, the topic can be a category or document stream feed name to which document messages (or records) are published. A topic can include a category used to organize messages, where each topic has a name that is unique across a cluster. Messages can be sent to and read from specific topics, where producers write data to topics, and consumers read data from topics.

In an embodiment, the messaging system 113 can include a listener module configured to listen for document updates in the multiple data sources. In an embodiment, the messaging system 113 can be configured to process the document messages in any suitable fashion, including processing the messages from one or more message queues in a serial manner, processing updates incrementally (e.g., in batches of documents at predetermined time intervals), etc.

In an embodiment, the distributed data source manager 112 is configured to provide an interface to the data graph manager 114 via which the documents streams (e.g., a set of document streams corresponding to the input document streams received from the data sources). are transmitted. In an embodiment, the distributed data source manager 112 is configured to adapt the documents received from the data sources to the set of document streams including document records containing data updates or information identifying document records to be deleted. In an embodiment, the distributed data source manager 112 can refresh the data from the data sources to identify data updates and synchronize the document streams following a configuration change. In an embodiment, the distributed data source manager 112 can maintain and apply a set of stream rules that identify one or more fields of the documents that are to be monitored for purposes of transmitting to the data graph manager 114 for further processing. In an embodiment, example fields include, but are not limited to, a name field, a project field, a source field, a type field, an account field, a subaccount field, a filter field, a label field, etc. In an embodiment, the distributed data source manager 112 applies the stream rules to identify a set of data from the documents corresponding to at least the fields identified by the one or more stream rules.

In an embodiment, the document format manager 115 of the data graph manager 114 can perform one or more input transformation functions with respect to the document messages received from the multiple data sources. In an embodiment, the document format manager 115 maintains and applies one or more input transform functions representing instructions regarding processing of an incoming document message according to one or more transformation definitions (e.g., a default transformation definition, a transformation corresponding to an arbitrary data-interchange format that provides an organized, human-readable structure (e.g., a JSON transformation), etc.). In an embodiment, the input transformation function can include a defined schema for formatting the data included in the document message received via the input document streams. The transformed document messages (e.g., the result of the input transformation function) establish a uniform or defined input schema (e.g., organized set of fields and corresponding data values) for further processing by the data graph manager 114.

In an embodiment, the merge manager 116 receives the set of transformed document streams (provided by the multiple different data sources) and merges the multiple streams of documents for incorporation into a corresponding user data graph stored in a data graph database 117. In an embodiment, the data graph manager 114 merges the data of the transformed input document into the corresponding nodes of the user data graph. In an embodiment, the input data document received from a data source (e.g., in a format defined by the data source) is parsed to enable transformation into the transformed document schema where each document includes one or more graph key properties which identify a corresponding node or relationship in a user data graph. In an embodiment, the one or more graph key properties provide information to identify a graph node in accordance with one or more attributes (e.g., an authority attribute identifying who is responsible for the key, a stability attribute enabling older systems to refer to newer data, a uniqueness context attribute, an opacity attribute, etc.).

In an embodiment, the data graph manager 114 performs the merge function by fetching an existing document graph node corresponding to the identified graph key. In an embodiment, the input document can be parsed or broken down into multiple different components such as a set of one or more field-values that are to be updated, a set of one or more graph edges to create or update corresponding to reference-type values, and metadata corresponding to the data source of the document message. In an embodiment, the data graph manager 114 uses the parsed or identified portions of the document message to generate or update a graph node to merge the data into the data graph associated with a user system (e.g., an entity). Additional details relating to the streaming system are provided in U.S. patent application Ser. No. 17/167,631, filed Feb. 4, 2021, the entirety of which is incorporated by reference herein.

As shown in FIG. 1, the streams are provided by the output document generator 118 to the stream manager 134 of the custom publisher stream manager 130 for use in the generation of the publisher data stream based on the configuration properties of a corresponding CaC file. According to embodiments, the stream manager 134 may be configured to perform various functions or actions in response to corresponding triggering events to generate the custom publisher streams. For example, the stream manager 134 can create a custom publisher stream (e.g., creation of a stream endpoint) in response to a triggering action including the creation of a CaC file (e.g., an installation of a CaC file in the application directory 133). In an embodiment, the stream manager 134 can perform an initial data fetch (e.g., run a refresh operation on a stream) in response to the creation of a CaC file. In an embodiment, the stream manager 134 can perform ongoing incremental updates in response to updates to the data of a data graph corresponding to a merchant system. In an embodiment, the stream manager 134 can perform recurring data delivery to obtain all data associated with a topic in response to a defined delivery frequency (e.g., a defined SFTP file delivery cadence).

In an embodiment, the stream manager 134 can delete one or more individual data records in response to an associated message from the data stream generated by the graph merge system 111. In an embodiment, the stream manager 134 can delete a custom publisher stream in response to the deletion of a CaC file (e.g., uninstalling a CaC file from the application directory 133).

According to embodiments, the stream manager 134 includes the transformation manager 136 configured to define how fields in the data graph streams generated by the graph merge system 111 are mapped to fields in the custom publisher stream that is provided to the custom publisher system. In an embodiment, the mapping actions executed by the transformation manager 136 enable a data graph stream having a first schema to be mapped or transformed to the publisher data stream (e.g., publisher data stream—custom publisher system 1, publisher data stream—custom publisher system 2 . . . publisher data stream—custom publisher system X, as shown in FIG. 1) in a second or transformed schema that corresponds to the respective custom publisher system. In an embodiment, if a given field is transformed, the field may retain the same field name. The destination fields of the publisher data stream sent to the custom publisher can have either an API name of the custom publisher for fields used in an API call or expected column headers in a file delivered to a file manager of the custom publisher (e.g., an SFTP of the custom publisher). In an embodiment, for function-type custom publishers, the mappings can be input into a function.

In an embodiment, the transformation manager 136 can establish a definition of a destination for the publisher data stream corresponding to the custom publisher system. According to embodiments, the destination can be a file-based (e.g., if the custom publisher is SFTP) or function-based. Each of the file-based destinations and function-based destinations can have a corresponding destination definition. For example, for a file-based destination (e.g., SFTP files), the destination definition identifies the file credentials (e.g., SFTP credentials) and file formats. In another example, for a function-based destination (e.g., a plug-in server associated with the custom publisher, as shown in FIG. 2), the destination definition identifies the plugin (e.g., "My_Plugin") and function (e.g., "My_Plug-in_Function") to be called.

Figure 2:
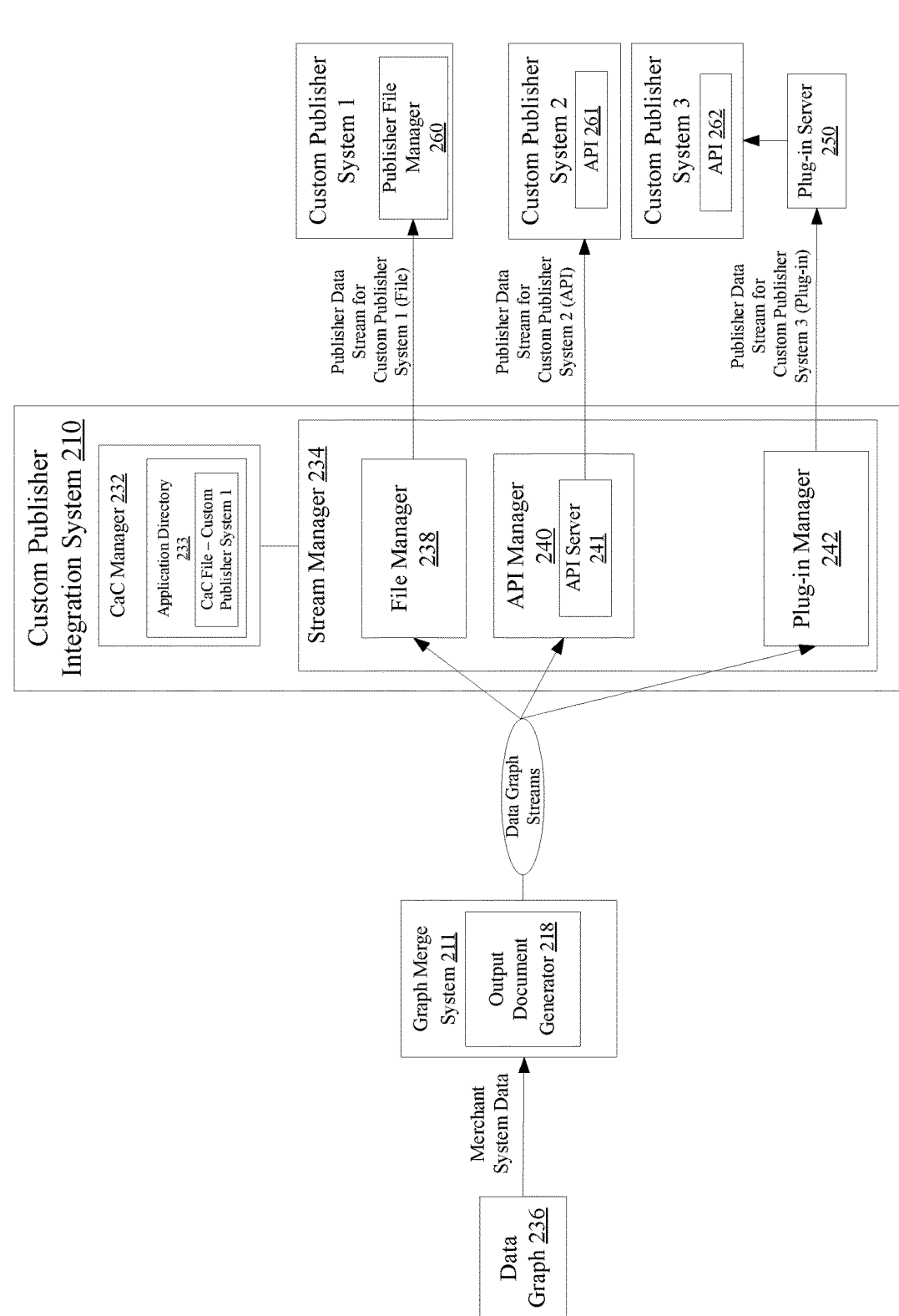
FIG. 2 illustrates an example custom publisher integration system including a stream manager to generate and deliver a publisher data stream to a publisher system, in accordance with one or more aspects of the disclosure.

FIG. 2 illustrates an example custom publisher integration system 210 to perform operations and functions to generate one or more publisher data streams for a custom publisher system (e.g., custom publisher system 1 shown in FIG. 2) based on one or more data graph streams including data associated with a merchant system. According to embodiments, the custom publisher integration system 210 includes a stream manager 234 that generates the publisher data stream based on a configuration file (e.g., a CaC file) that corresponds to the downstream custom publisher that receives the publisher data stream.

As shown, a data graph (e.g., a knowledge graph) including data associated with a merchant system (e.g., merchant system data) is maintained. The merchant system data is processed by a graph merge system 211 (also referred to as a "streams system") which generates one or more data graph streams including the merchant system data in a first format or schema.

The custom publisher integration system 210 is configured to receive streams of data associated with a merchant system from the graph merge system 211 for use is generating the publisher data stream for a custom publisher system.

According to embodiments, the custom publisher integration system 210 employs the stream manager 234 to manage the "stream processing" of publisher data streams to the custom publisher system. Stream processing is employed to enable the custom publisher integration system 210 to exploit parallelization in this manner. The stream processing employed by the custom publisher integration system 210 represents an improvement in contrast with the batch processing employed by typical systems. With batch processing, applications process batches of data based on a schedule or a predefined threshold (every night at 12 pm; every 100 new records). As such, in certain conventional systems, the application processes multiple data records at once and the batches can be variable sizes. Advantageously, the stream manager 234 can process events in real-time as they arise. Stream processing is most suitable for applications where there is a high degree of independence between the records or events in question. For example, the same function can be applied to all the records in the input stream. This allows applications to parallelize the computation, or execute the function on multiple records simultaneously.

In an example, as shown in FIG. 2, the publisher data stream, transformed in accordance with a CaC file associated with custom publisher system 1, can include merchant data that is published by custom publisher system 1 to end-user systems (e.g., customers of the merchant system). For example, the merchant data published by custom publisher system 1 can include information relating to a business listing associated with the merchant system (also referred to as a "listing").

According to embodiments, as shown in FIG. 2, the publisher data stream can be provided by the custom publisher integration system 210 to a custom publisher system via one or more communication protocols including via a file transfer protocol (e.g., custom publisher system 1), an API server (e.g., custom publisher system 2), or a computer program plug-in (e.g., custom publisher system 3). As shown in FIG. 2, the stream manager 234 can include a file manager 238 configured to generate one or more files (e.g., SFTP files) including the publisher data stream for provisioning to a publisher file manager 260 of custom publisher system 1. In an embodiment, the stream manager 234 includes an API manager 240 managing an API server 241 configured to provision the publisher data stream to custom publisher system 2 via an API communication connection 261. In an embodiment, the stream manager 234 includes a plug-in manager 242 configured to provision the publisher data stream to a plug-in server 250 communicatively coupled to an API 262 of custom publisher system 3 via a plug-in communication connection.

To transform a data portal (e.g., a data portal provisioning merchant business listing information to publisher systems) for use by an external developer, the CaC files (e.g., CaC file—custom publisher system 1) can be installed to establish configurations for custom publisher systems. Advantageously, developers can establish custom publisher systems by installing CaC files through the application directory 233 and automatically configure a push, transformation, and execution on data to the desired custom publisher system destination. Accordingly, new publisher systems to the data distribution network of the custom publisher integration system 210 with customized data streams based on corresponding data graph streams associated with a respective merchant system.

According to embodiments, the custom publisher configurations defined by a corresponding CaC file can be created by developers and the models can be enabled via the application directory 233. With this installation, streams can be configured for an account per-publisher and allow data to flow out of a data graph associated with a merchant system. In an embodiment, the publisher configuration file (CaC file) can define a schema for the publisher data stream to be provisioned to the publisher system. The configuration parameters of the CaC file can include one or more fields including a name field, an identifier field, a medallion field, and a description field. The CaC file can further define the corresponding publisher data stream, one or more destination fields (e.g., fields of the publisher system), mappings from head to publisher fields, and a destination for the publisher system (e.g., an API function destination, a plug-in destination, or a file destination). The applications (e.g., CaC files) can be added to the application directory 233 as a CaC publisher record including metadata associated with the custom publisher system. The application directory 233 can create a custom publisher CaC model resource that is applied to each merchant account when the corresponding application is installed. The CaC model resources that are created and updated can be sent (e.g., uploaded or upserted) to a function or server (e.g., publisher stream configuration server) that handles tasks associated with configuring the publisher data stream. This structure allows users to transform and send data to custom publisher systems' APIs using, for example, a plug-in (e.g., executable code snippets to be executed on the publisher data stream).

Figure 3:
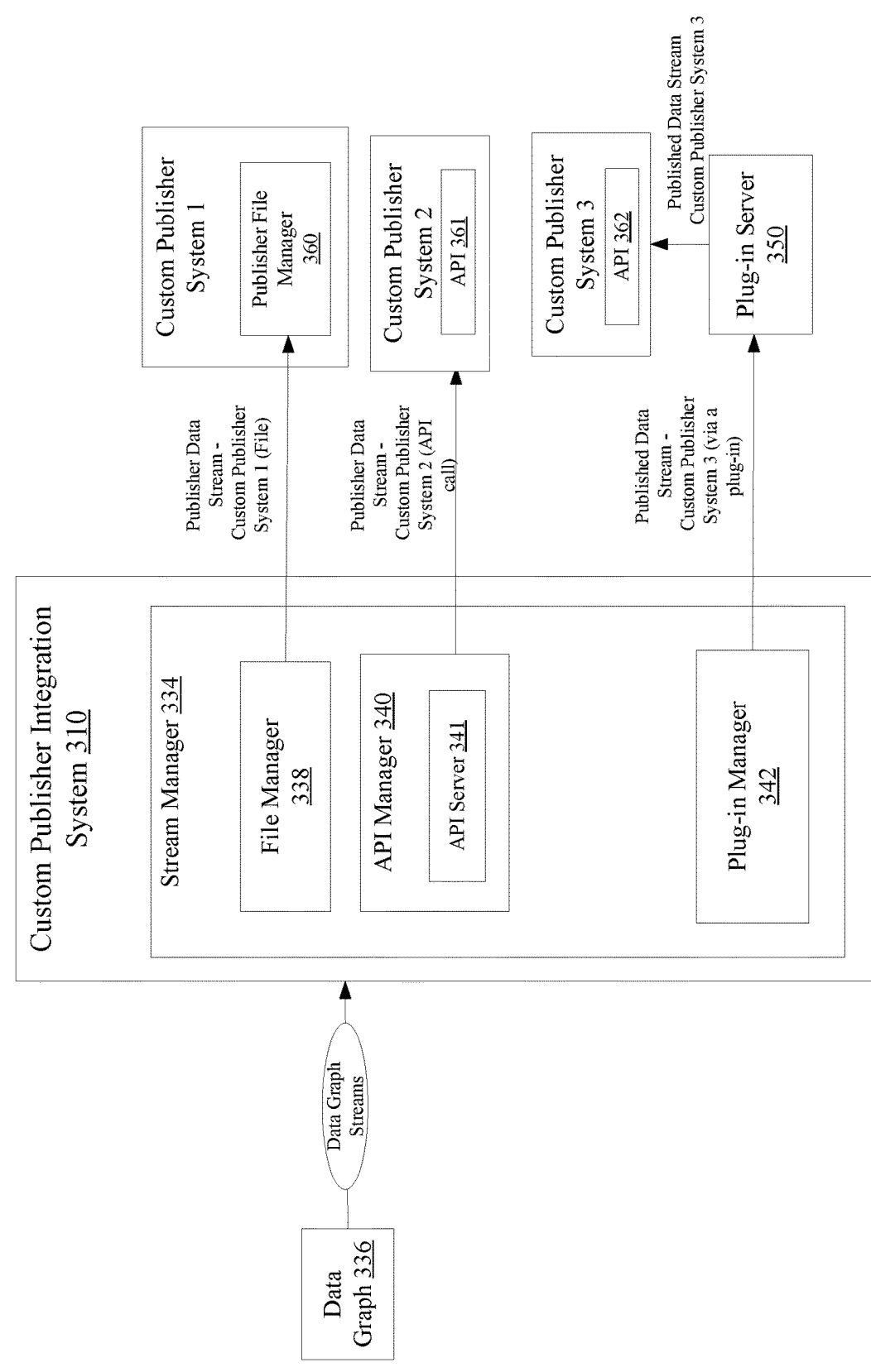
FIG. 3 illustrates an example custom publisher integration system including components configured to generate and deliver a publisher data stream to a publisher system via one or more delivery methods, in accordance with one or more aspects of the disclosure.

FIG. 3 illustrates an example custom publisher integration system 310 generating a publisher data stream for exporting to a custom publisher system (custom publisher system 1) via one or more of a file transfer protocol, an API connection, or a plug-in program. According to the example export architecture shown in FIG. 3, data graph streams flow from a data graph 336 associated with a merchant system when new data is added or edits, updates, etc. are made to the data and flow into the stream manager 334. According to embodiments, the data graph streams can flow into one or more of a file manager 338 (e.g., a file exporter server), an API manager 340 (e.g., a publisher application message handling system), and a plug-in manager 342. According to embodiments, the stream manager 334 (e.g., the file manager 338, the API manager 340, and the plug-in manager 342) is configured to handle publisher field mappings, store listings data (e.g., for SFTP files), and execute referenced plug-ins on the streamed data (e.g., for plug-in delivery). In an embodiment, plug-in server 350 can run the invoked plug-in to, for example, push the publisher data stream to an API 362 of custom publisher system 3. In an embodiment, the file manager 338 can create one or more files for custom publisher system 1 using a file transfer protocol for delivery of the publisher data stream.

According to embodiments, the stream manager 334 manages updates to the application directory and configures or removes one or more streams for an account. In an embodiment, the stream manager 334 can store a per-account custom publisher system configuration for the export managers (e.g., file manager 338, API manager 340, and plug-in manager 342) to reference during exporting of the publisher data stream to the custom publisher system. The stream manager 334 can include an interface to call into and upsert CaC files. In response to an update, the stream manager 334 deserializes the CaC stream components (e.g., fields, source, filters, etc.) and configures the custom publisher stream using a data graph associated with a merchant system as a source. In an embodiment, the stream manager 334 can execute a call to resend data for a newly configured custom publisher system stream.

In an embodiment, the stream manager 334 can listen for messages from the application directory corresponding to the creation of a new CaC file. Once a notification is received, the stream manager 334 checks for the existence of the application based on the application identifier. If the application is new, the stream manager 334 fetches a new publisher identifier and inserts the new CaC publisher record into a CaC publisher database using an endpoint associated with the publisher system. In an embodiment, the application identifier can be used to make a call to the API server 341 to fetch the appropriate CaC file for use in generating the publisher data stream to send to an API 361 of custom publisher system 2 via an API call. In an embodiment, the configuration metadata (e.g., destination and publisher type) can be parsed from the response and stored for exporting purposes (e.g., based on the type of exporting that is being used, such as file exporting, API exporting, or plug-in exporting).

As shown in FIG. 3, the plug-in manager 342 can be used for provisioning the publisher data stream to custom publisher system 3 via a plug-in connection using plug-in server 350. The plug-in manager 342 can serve as an entry point to the CaC file pipeline from a configured stream. In an embodiment, the plug-in manager 342 can include a remote procedural call (RPC) server configured to consume data from a topic (e.g., a Kafka topic) of the data graph 336. The plug-in manager 342 can filter out streamed records using a record identifier that is not associated with an API 362 of custom publisher system 3.

The plug-in manager 342 can maintain an in-memory set of data identifying for accounts having an on-going or in-process refresh job. The plug-in manager 342 can handle refresh updates and maintain data in an in-memory buffer or data store. In an embodiment, once the in-memory data store reaches a threshold level or batch size, the data can be sent to plug-in server 350 to invoke the plug-in and close the corresponding batch (e.g., by committing to the most recent record offset). The plug-in manager 342 can map the fields of the data graph streams to the corresponding fields of the publisher data stream of the custom publisher system by fetching the publisher configuration metadata (e.g., from a data structure such as a table), deserialize the one or more destination fields of an object (e.g., a JSON object) into a map, and use the map to create a new object (e.g., a JSON object) with the mapped field names. In an embodiment, the plug-in manager 342 can make a call based on the mapped data object.

In an embodiment, the file manager 338 can be used for provisioning the publisher data stream to a publisher file manager 360 of custom publisher system 1 via a file transfer protocol. The file manager 338 can serve as an entry point to the CaC file pipeline from a configured stream. In an embodiment, the file manager 338 can include a remote procedural call (RPC) server configured to consume data from a topic (e.g., a Kafka topic) of the data graph 336. The file manager 338 can filter out streamed records using a record identifier that is not associated with a file transfer protocol of custom publisher system 1. The file manager 338 can map the fields of the data graph streams to the corresponding fields of the publisher data stream of custom publisher system 1 by fetching the publisher configuration metadata (e.g., from a data structure such as a table), deserialize the one or more destination fields of an object (e.g., a JSON object) into a map, and use the map to create a new object (e.g., a JSON object) with the mapped field names. The mapped data can be stored and accessed for delivery to the publisher file manager 360 of the custom publisher system in accordance with a suitable file transfer protocol.

In an embodiment, the stream manager 334 can include a program (e.g., a Daemon) configured to execute a task to reference a custom publisher system schedule and query a data structure including a queue of pending data to fetch the data to be delivered to the custom publisher system (e.g., custom publisher system 1) as a file. In an embodiment, the program can make a call to a repository to obtain a publisher file configuration (e.g., file format, credentials, location, etc.) and use the returned values to export the file to custom publisher system 1. In an embodiment, the program can track which files have been delivered and update the repository of queue of data that is pending delivery.

Figure 4:
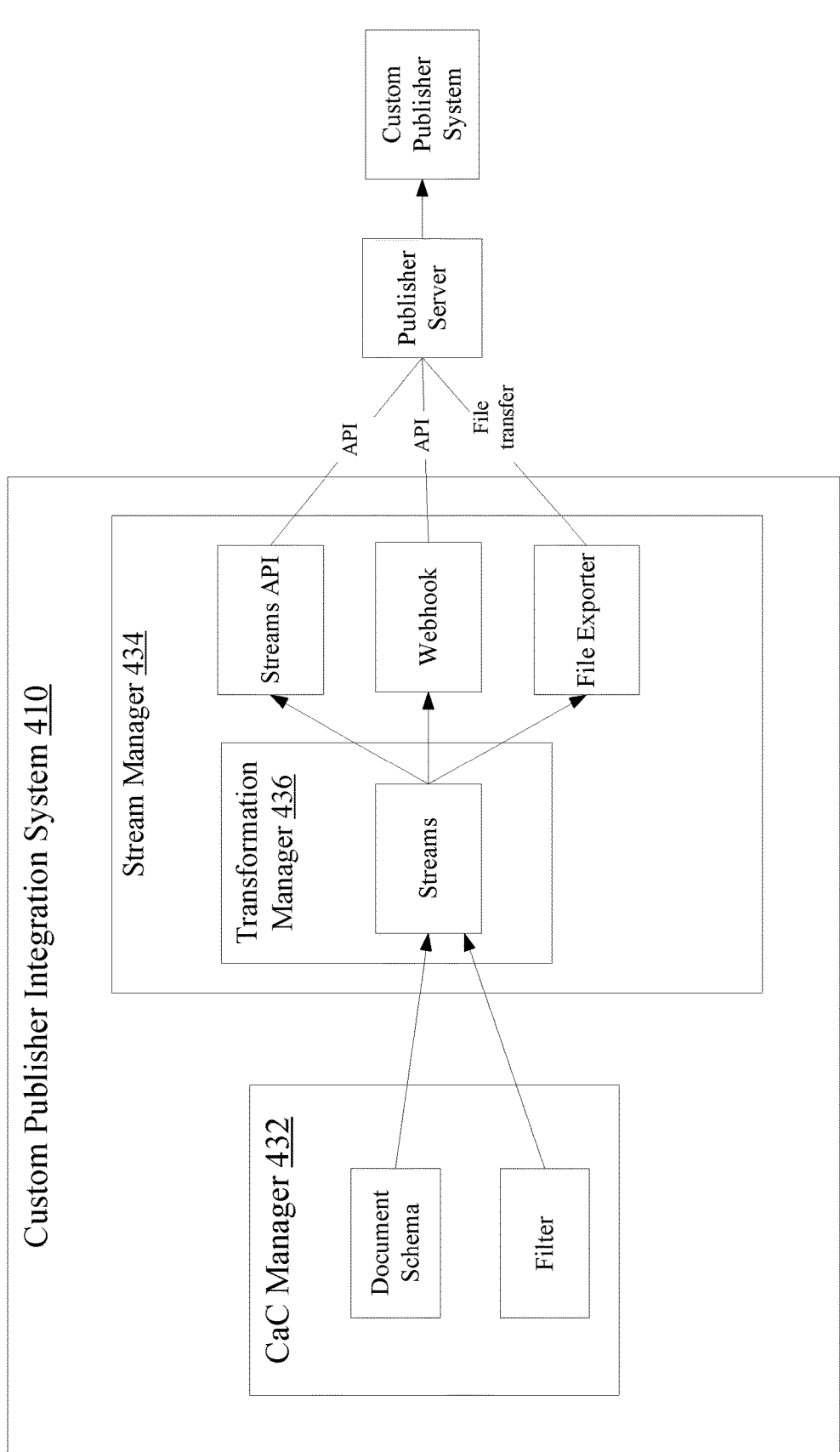
FIG. 4 illustrates an example custom publisher integration system including components configured to apply a document schema and one or more filters to generate transformed data streams for delivery to a publisher system, in accordance with one or more aspects of the disclosure.

FIG. 4 illustrates an example custom publisher integration system 410, according to embodiments of the present disclosure. The custom publisher integration system 410 includes a CaC manager 432 and a stream manager 434. In an embodiment, the custom publisher integration system 410 initiates an integration of a custom publisher by identifying data to be synchronized or extracted from a data graph associated with a merchant system. The custom publisher integration system 410 enables the streaming of any fields for any entities from the data graph, making those fields and field values available to downstream systems that communicatively couple to the publisher systems. In an embodiment, the streams specify the entity types and fields that are to be extracted from the data graph, transforms the data into the format the publisher system can process, and specifies the exact output (including field names) data format.

In an embodiment, the fields that are to be streamed from the data graph are selected and transformed based on a CaC file associated with a respective publisher system. The CaC file includes a document schema associated with publisher system that contains a list of all of the fields and field types that the publisher system is configured to process to publish data associated with a merchant system (e.g., merchant listing data). The document schema of the CaC file, when specified in a stream, ensures the fields in the stream output match the expected fields in the schema file.

The CaC manager 432 manages the CaC files associated with the one or more publisher systems. The CaC files can be specified as the validation schema to enable the custom publisher integration system 410 to compare the fields in the output of the stream file with the fields in the field validation file. If there is a mismatch, the custom publisher integration system 410 can determine the proper data is not being streamed for the particular integration. The CaC file is used to stream the data and validate the fields included in each streamed document.

In an embodiment, the CaC files managed by the CaC manager 432 can include one or more filters that, when specified in a stream, ensure that only entities that match the specified filter criteria are streamed. In an embodiment, the one or more filters can include an entity type filter that filters the data graph streams from the data graph to stream one or more entities of a specific type (e.g., location, product, hotel name, hotel room, healthcare facility, healthcare professional, menu, event, job, etc.). In an embodiment, the one or more filters can include a filter configured to provide further control over the specified data that is to be sent to the publisher system, and which data is to be filtered out or held back from delivery to the publisher system. This further filter can be represented as a part of a CaC file associated with an integration of a publisher system and can be used to avoid the unintentional streaming of undesired entity types. As illustrated in FIG. 4, the document schema and one or more filters are applied to establish a data stream from the data graph in accordance with the document schema to validate the data stream is sending the correct fields (e.g., in view of the publisher system's expected schema) and one or more filters validating the data stream is sending the correct entities.

In an embodiment, the validated and filtered data stream is prepared by the stream manager 434 for delivery to a publisher system that is external to the custom publisher integration system 410. In an embodiment, a custom publisher integration can take the data stream from the custom publisher integration system 410 and send the data stream to the publisher system in accordance with one or more delivery protocols. In an embodiment, a first delivery protocol, or pull protocol, can be implemented to fetch a comprehensive set of updates to send to the publisher system on a reoccurring periodic basis (e.g., a with defined frequency or cadence). In an embodiment, a second delivery protocol, or push protocol, can be implemented to listen for incremental data updates and pass the updates along to the endpoint, substantially in real time. In an embodiment, a third delivery protocol, or push-pull protocol, can be implemented to combine the push protocol and the pull protocol. In an embodiment, a fourth delivery protocol, or file transfer protocol, can be implemented to receive a file with the data stream (e.g., a CSV file) for submission to the publisher system.

In an embodiment, the streams API shown in FIG. 4 is implemented to manage the data pulls. The publisher integration can fetch data from a respective streams API endpoint whenever an update is appropriate. In an embodiment, the streams API is a system that can reside in an application developer's account that receives data from streams and allows an integration to fetch comprehensive data to send to a publisher system.

In an embodiment, one or more webhooks (e.g., a web callback or HTTP push API) can be provided as a system that resides in an application developer's account that receives data from streams and allows an integration to incrementally send updates to a publisher system. In an embodiment, for the incremental data updates, the publisher integration can listen to the one or more webhooks. Streamed data updates will cause webhooks to execute to indicate to the publisher integration that an incremental update is to be sent to the endpoint.

In an embodiment, a file exporter can be implemented as a system that resides in the application developer's account and receives data from streams to allow an integration to receive a file (e.g., a CSV file) according to a file transfer protocol (e.g., SFTP), to send to a publisher system.

In an embodiment, when the data from data graph is filtered, validated, streamed, and exported from the stream manager 434 via one of the streams API, a webhook, or the file Exporter, the data stream in the custom publisher schema is sent to the custom publisher system. In an embodiment, a developer can build a publisher integration hosted on a server (the "publisher server" of FIG. 4) external to the custom publisher integration system 410 that is configured to send data to the publisher system. The publisher integration of the publisher server may be configured to perform one or more functions including: execution of Open Authorization (OAuth) for access delegation to enable end-users to grant websites or applications access to their information on other websites, without providing a password; retry logic, rate limiting, and error handling.

In an embodiment, the publisher server sends the data stream to the publisher system, where the publisher can store and/or display the data. In an embodiment, the data streamed to the publisher system can be published as a listing associated with a merchant system or stored in the publisher's platform. Advantageously, the data streamed to the publisher system by the custom publisher integration system 410 matches the data that is stored and maintained in the data graph associated with a merchant system.

In an embodiment, the publisher system can be configured to include a status update API to allow publisher integrations to capture feedback information from the publisher system and provide the feedback to the custom publisher integration system 410. The feedback can include information indicating if the data stream was successfully delivered to the publisher system. In an embodiment, a user interface (also referred to as a "publisher UI") can be provided to display (e.g., on a per endpoint basis, on a per listing basis, etc.) a status associated with a set of merchant data (e.g., a merchant business listing). In an embodiment, the status update API can be implemented to further capture additional information from the publisher system including analytics, reviews, and other end-user generated content. In an embodiment, the publisher UI can display information based on metadata (e.g., fields such as name, medallion, and description) about the publisher system that is stored in an application in the application directory. Individual listing data from the status update API can be displayed via the publisher UI to enable a user to view information about a publisher system, including viewing the listing, entity detail, feedback, etc.

FIG. 5 illustrates a flow diagram relating to an example method 500 including operations performed by a custom publisher integration system 110 (e.g., custom publisher integration system 110, 210, 310, and 410 of FIGS. 1, 2, 3, and 4, respectively, according to embodiments of the present disclosure. It is to be understood that the flowchart of FIG. 5 provides an example of the many different types of functional arrangements that may be employed to implement operations and functions performed by one or more modules of the custom publisher integration system as described herein. Method 500 may be performed by a processing logic that may comprise hardware (e.g., circuitry, dedicated logic, programmable logic, microcode, etc.), software (e.g., instructions run on a processing device), or a combination thereof. In one embodiment, the custom publisher integration system executes the method 500 to provision a data stream to a custom publisher system including data associated with a merchant system that is transformed into a schema suitable for processing by the custom publisher system.

In operation 510, the processing logic identifies a first data stream from a data graph associated with a merchant system. The first data stream can have a first schema defining fields associated with data relating to the merchant system. For example, the first data stream can include one or more fields and field values corresponding to a business listing associated with the merchant system that can be published by one or more publisher systems.

In operation 520, the processing logic identifies a configuration file associated with a publisher system to receive data associated with the merchant system. For example, the configuration file (e.g., a CaC file) can include configuration parameters or properties that define a schema (e.g., a second schema) associated with a publisher system. In an embodiment, the publisher system (e.g., a custom publisher system) can be integrated by the processing logic by installing the configuration file in an application directory. In operation 520, the configuration file installed in the application directory can be identified for use in generating a data stream for delivery to the publisher system. In an embodiment, the publisher system is configured to receive the data associated with the merchant system and subsequently publish the merchant data in a schema or format associated with that publisher system.

In operation 530, the processing logic generates, based on the configuration file associated with the publisher system, a second data stream including the data associated with the merchant system. In an embodiment, the configuration parameters of the configuration file are used to identify which data of the first data stream is to be extracted and included in the second data stream. In an embodiment, in addition, the configuration parameters of the configuration file are used to transform the first schema of the first data stream to a second schema of the second data stream. In an embodiment, the second schema of the second data stream represents the fields and format of the data from the data graph that the publisher system is configured to process. In an embodiment, the configuration file is used to identify the data to be taken from the first data stream, transform the identified data to the schema associated with the publisher system, and map the identified data to one or more fields of the publisher system schema.

In operation 540, the processing logic transmits the second data stream to the publisher system. In an embodiment, the second data stream can be delivered to the publisher system by one or more of a file transfer, an API call, or a plug-in program, as described in detail above with reference to FIGS. 3 and 4. In an embodiment, the second data stream including the merchant data can be stored and/or displayed by the publisher system (e.g., published to one or more end-user systems). For example, the second data stream can include updated data associated with a business listing of the merchant, which the publisher system can store and publish to end-user systems.

Advantageously, installing the configuration files in application directory provides an account (e.g., a merchant system account) with use of the configuration files (e.g., CaC files) to enable publisher system integration needed to send data to any external publisher system (e.g., a custom or new publisher system that did not previously receive a merchant data stream).

Figure 6:
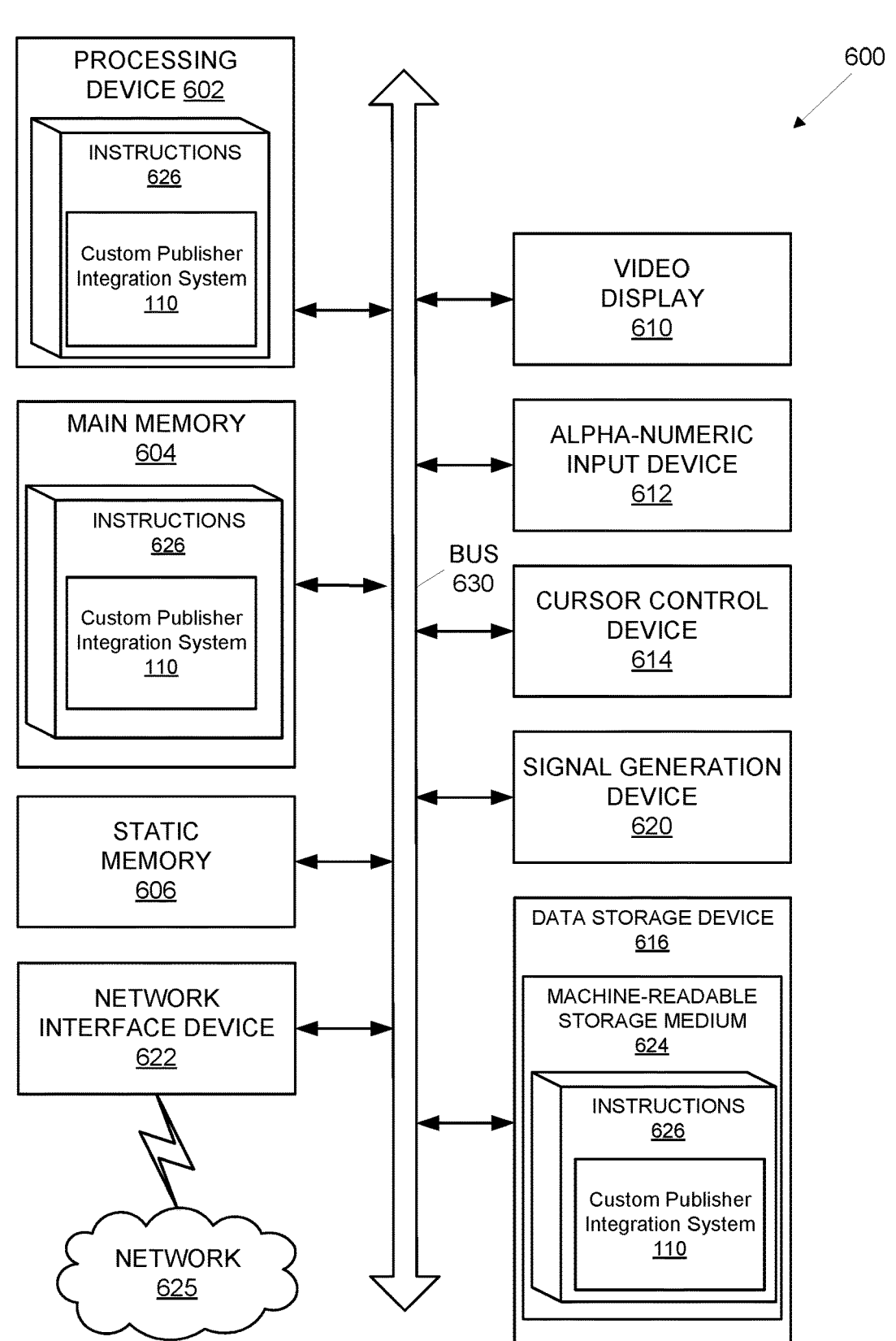
FIG. 6 illustrates an example computer system operating in accordance with some implementations.

FIG. 6 illustrates an example computer system operating in accordance with some implementations. FIG. 6 illustrates an example computer system 600 operating in accordance with some embodiments of the disclosure. In FIG. 6, a diagrammatic representation of a machine is shown in the exemplary form of the computer system 600 within which a set of instructions, for causing the machine to perform any one or more of the methodologies discussed herein, may be executed. In alternative embodiments, the machine 600 may be connected (e.g., networked) to other machines in a local area network (LAN), an intranet, an extranet, or the Internet. The machine 600 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine

600. Further, while only a single machine is illustrated, the term "machine" shall also be taken to include any collection of machines that individually or jointly execute a set (or multiple sets) of instructions to perform any one or more of the methodologies discussed herein.

The example computer system 600 may comprise a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 616), which may communicate with each other via a bus 630. Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets.

Processing device 602 may also be one or more special-purpose processing devices such as an application specific integrated circuit (ASIC), a field programmable gate array (FPGA), a digital signal processor (DSP), network processor, or the like. Processing device 602 is configured to execute a search term management system for performing the operations and steps discussed herein. For example, the processing device 602 may be configured to execute instructions implementing the processes and methods described herein, for supporting a search term management system, in accordance with one or more aspects of the disclosure.

Example computer system 600 may further comprise a network interface device 622 that may be communicatively coupled to a network 625. Example computer system 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 620 (e.g., a speaker).

Data storage device 616 may include a computer-readable storage medium (or more specifically a non-transitory computer-readable storage medium) 624 on which is stored one or more sets of executable instructions 626. In accordance with one or more aspects of the disclosure, executable instructions 626 may comprise executable instructions encoding various functions of the custom publisher integration system 110 in accordance with one or more aspects of the disclosure.

Executable instructions 626 may also reside, completely or at least partially, within main memory 604 and/or within processing device 602 during execution thereof by example computer system 600, main memory 604 and processing device 602 also constituting computer-readable storage media. Executable instructions 626 may further be transmitted or received over a network via network interface device 622.

While computer-readable storage medium 624 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating," "receiving," "transforming," "provisioning," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:

identifying a first data stream of a first entity type from a knowledge graph associated with a merchant system, wherein the knowledge graph stores merchant data of one or more entity types that are interlinked with each other, and wherein the first data stream is configured in accordance with a first schema;

installing a configuration file comprising a first set of configuration parameters associated with the merchant system and a publisher system, wherein the publisher system is created based on the configuration file, wherein the configuration file specifies one or more mappings from a head entity in the knowledge graph associated with the merchant system to the publisher system, and a destination endpoint for the publisher system;

transforming, by a processor in real-time, based on the configuration file associated with the publisher system, the first data stream into a second data stream comprising data associated with the merchant system, wherein the transforming comprises applying a same function to each data record of a plurality of data records in the first data stream, such that the transforming is parallelized for the plurality of data records in the first data stream, wherein a second schema of the second data stream is configured in accordance with the first set of configuration parameters to enable ingestion of the data associated with the merchant system by the publisher system; and transmitting the second data stream to the publisher system, wherein at least a portion of the data associated with the merchant system is published by the publisher system to an end-user system.

2. The method of claim 1, wherein the configuration file comprises a configuration-as-code (CaC) file.

3. The method of claim 2, wherein the CaC file comprises the set of configuration parameters defining the second schema associated with the second data stream.

4. The method of claim 1, wherein one or more fields of the data associated with the merchant system are transformed from the first schema of the first data stream to the second schema of the second data stream.

5. The method of claim 1, wherein the transforming comprises mapping a first data field of the first data stream to a second data field of the second data stream in accordance with the configuration file.

6. The method of claim 1, wherein the second data stream is transmitted to the publisher system via one of a file transfer, an application programming interface (API) call, or a plug-in program.

7. The method of claim 1, wherein one or more sets of data of the first data stream are identified for inclusion in the second data stream based on the configuration file.

8. A system comprising:

a memory to store instructions; and a processing device, operatively coupled to the memory, to execute the instructions to perform operations comprising:

identifying a first data stream of a first entity type from a knowledge graph associated with a merchant system, wherein the knowledge graph stores merchant data of one or more entity types that are interlinked with each other, and wherein the first data stream is configured in accordance with a first schema;

installing a configuration file comprising a first set of configuration parameters associated with the merchant system and a publisher system, wherein the publisher system is created based on the configuration file, wherein the configuration file specifies one or more mappings from a head entity in the knowledge graph associated with the merchant system to the publisher system, and a destination endpoint for the publisher system;

transforming in real-time, based on the configuration file associated with the publisher system, the first data stream into a second data stream comprising data associated with the merchant system, wherein the transforming comprises applying a same function to each data record of a plurality of data records in the first data stream, such that the transforming is parallelized for the plurality of data records in the first data stream, wherein a second schema of the second data stream is configured in accordance with the first set of configuration parameters to enable ingestion of the data associated with the merchant system by the publisher system; and transmitting the second data stream to the publisher system, wherein at least a portion of the data associated with the merchant system is published by the publisher system to an end-user system.

9. The system of claim 8, wherein the configuration file comprises a configuration-as-code (CaC) file.

10. The system of claim 9, wherein the CaC file comprises the set of configuration parameters defining the second schema associated with the second data stream.

11. The system of claim 8, wherein one or more fields of the data associated with the merchant system are transformed from the first schema of the first data stream to the second schema of the second data stream.

12. The system of claim 8, wherein the transforming comprises mapping a first data field of the first data stream to a second data field of the second data stream in accordance with the configuration file.

13. The system of claim 8, wherein one or more sets of data of the first data stream are identified for inclusion in the second data stream based on the configuration file.

14. A non-transitory computer readable storage medium comprising instructions that, when executed by a processing device, cause the processing device to perform operations comprising:

identifying a first data stream of a first entity type from a knowledge graph associated with a merchant system, wherein the knowledge graph stores merchant data of one or more entity types that are interlinked with each other, and wherein the first data stream is configured in accordance with a first schema;

installing a configuration file comprising a first set of configuration parameters associated with the merchant system and a publisher system, wherein the publisher system is created based on the configuration file, wherein the configuration file specifies one or more mappings from a head entity in the knowledge graph associated with the merchant system to the publisher system, and a destination endpoint for the publisher system;

transforming in real-time, based on the configuration file associated with the publisher system, the first data stream into a second data stream comprising data associated with the merchant system, wherein the transforming comprises applying a same function to each data record of a plurality of data records in the first data stream, such that the transforming is parallelized for the plurality of data records in the first data stream, wherein a second schema of the second data stream is configured in accordance with the first set of configuration parameters to enable ingestion of the data associated with the merchant system by the publisher system; and transmitting the second data stream to the publisher system, wherein at least a portion of the data associated with the merchant system is published by the publisher system to an end-user system.

15. The non-transitory computer readable storage medium of claim 14, wherein the configuration file comprises a configuration-as-code (CaC) file.

16. The non-transitory computer readable storage medium of claim 15, wherein the CaC file comprises the set of configuration parameters defining the second schema associated with the second data stream.

17. The non-transitory computer readable storage medium of claim 14, wherein one or more fields of the data associated with the merchant system are transformed from the first schema of the first data stream to the second schema of the second data stream.

18. The non-transitory computer readable storage medium of claim 14, wherein the transforming comprises mapping a first data field of the first data stream to a second data field of the second data stream in accordance with the configuration file.

19. The non-transitory computer readable storage medium of claim 14, wherein one or more sets of data of the first data stream are identified for inclusion in the second data stream based on the configuration file.

20. The method of claim 1, wherein the knowledge graph is generated solely based on the merchant system.

* * * * *